(12) United States Patent
Liu et al.

(10) Patent No.: US 11,086,374 B2
(45) Date of Patent: Aug. 10, 2021

(54) TRANSMISSION INTERFACE CIRCUIT HAVING A PLURALITY OF POWER SUPPLY PATHS WHEREBY TRANSMISSION ARE PLACED IN ONE OF A CONDUCTIVE OR NONCONDUCTIVE STATE

(71) Applicant: JMicron Technology Corp., Hsin-Chu (TW)

(72) Inventors: Chao-Yin Liu, Hsinchu (TW); Cheng-Ping Fang, Hsinchu County (TW)

(73) Assignee: JMicron Technology Corp., Hsin-Chu (TW)

( * ) Notice: Subject to any disclaimer, the term of this patent is extended or adjusted under 35 U.S.C. 154(b) by 30 days.

(21) Appl. No.: 16/744,143

(22) Filed: Jan. 15, 2020

(65) Prior Publication Data

US 2020/0241617 A1      Jul. 30, 2020

(30) Foreign Application Priority Data

Jan. 30, 2019   (TW) .................................. 108103510

(51) Int. Cl.
*G06F 1/26*       (2006.01)
*G06F 13/16*    (2006.01)
(Continued)

(52) U.S. Cl.
CPC .............. *G06F 1/266* (2013.01); *G06F 1/263* (2013.01); *G06F 1/28* (2013.01); *G06F 3/065* (2013.01); *G06F 3/0619* (2013.01); *G06F 3/0673* (2013.01); *G06F 13/1668* (2013.01); *G06F 13/4022* (2013.01); *H04B 1/38* (2013.01)

(58) Field of Classification Search
CPC . G06F 1/266; G06F 1/263; G06F 1/28; G06F 3/0619; G06F 3/065; G06F 3/0673; G06F 13/1668; G06F 13/4022; H04B 1/38
See application file for complete search history.

(56) References Cited

U.S. PATENT DOCUMENTS 5,125,006 A  *  6/1992  Marinaro .......... H04L 12/40013
                                                                375/219
7,941,676 B2 *  5/2011  Glaser ..................... E04F 15/02
                                                                713/300
(Continued)

FOREIGN PATENT DOCUMENTS

TW       200516475           5/2005
TW       201240190 A1      10/2012
(Continued)

*Primary Examiner* — Tammara R Peyton
(74) *Attorney, Agent, or Firm* — Winston Hsu

(57) ABSTRACT

A transmission interface circuit includes a power supply port, a first power path, first data transmission path, second power path and controller. The first power port is coupled to the storage device to provide the storage device with power. The first data transmission path is coupled between the storage device and the electronic device to perform data transmission between the storage device and the electronic device. The second power port is coupled to the electronic device to provide the electronic device with power. The controller respectively control enables or disables the first power path, the second power path and the first data transmission path according to the information transmitted from the electronic device.

15 Claims, 5 Drawing Sheets

(51) Int. Cl.
*G06F 13/40* (2006.01)
*G06F 3/06* (2006.01)
*H04B 1/38* (2015.01)
*G06F 1/28* (2006.01)

(56) References Cited

U.S. PATENT DOCUMENTS 9,645,962 B2 5/2017 Voto
9,997,939 B2 6/2018 Li

FOREIGN PATENT DOCUMENTS

| | | |
|---|---|---|
| TW | 201703392 A | 1/2017 |
| TW | M544148 U | 6/2017 |

* cited by examiner

TRANSMISSION INTERFACE CIRCUIT HAVING A PLURALITY OF POWER SUPPLY PATHS WHEREBY TRANSMISSION ARE PLACED IN ONE OF A CONDUCTIVE OR NONCONDUCTIVE STATE

BACKGROUND OF THE INVENTION

1. Field of the Invention

The present invention relates to applications of using a cellphone (e.g. a smartphone) to access an external hard drive. More particularly, the present invention focuses on the management of charging a cellphone and performing data backup.

2. Description of the Prior Art

Compared with personal computers (PCs), smartphones have very limited storage space. To ensure sufficient space for the mobile phone to store data (e.g. taking photos, videos, etc.), the user must perform backups from time to time, in order to move data that occupies a huge amount of inner space of the smartphone or a huge amount of external space, such as an external hard drive.

As far as the capacity and price is considered, hard disk drives (HDDs) or solid state drives (SSDs) are generally more noticeable to consumers. Further, considering that backing up the data of a smartphone may consume a lot of power, some dedicated products with the file transmission function as well as the device charging function (such as various hard drive enclosures or some other products with similar functions) have been proposed. Generally, the power of these products are provided with by an adopter, wherein USB cables (or the more recent USB TYPE-C cables) can be used as the connection between an HDD enclosure and an adopter, or as the connection between an HDD enclosure and a smartphone. For the cost concerns, a purchased smartphone is rarely given with a high power adopter (such as a 10 W adopter), but a low power adopter (such as a 5 W adopter) instead. Further, the most commonly seen adopters in one's apartment are also 5 W. Low power adopters may result in some problems in the above usages. For example, a low power adopter cannot provide sufficient power to both the smartphone and the HDD. When the HDD is powered on, insufficient power may merely turn on the HDD for a short time and then the HDD will be off immediately. This not only makes the user unable to perform backup operations, but also reduces the lifespan of the HDD in a great extent.

In view of the above, it is an important issue in this field to provide a novel architecture and associated method for solving the above-mentioned problem.

SUMMARY OF THE INVENTION

An objective of the present invention is to obtain the state (e.g. remaining electricity, the user identity, and so on) of the smartphone through an application (App), thus making the HDD enclosure that connected to the smartphone opt to enter a smartphone charging-preferential mode or smartphone backup-preferential mode under insufficient power from the adopter.

An embodiment of the present invention provides a transmission interface circuit that is arranged to provide transmissions between an electronic device and a storage device. The transmission interface circuit comprises a power supply port, a first power path, a first data transmission path, a second power path and a controller. The power supply port is coupled to a power source. The first power path is coupled to a first power port, wherein the first power port is coupled to the storage device for providing power for the storage device. The first data transmission path is coupled between the storage device and the electronic device, is and arranged to perform data transmissions between the storage device and the electronic device. The second power path is coupled to a second power port, wherein the second power port is coupled to the electronic device for providing power for the electronic device. The controller is arranged to control the first power path, the second power path and the first data transmissions to be conducting or non-conducting according to a message sent from the electronic device.

An embodiment of the present invention provides a transmission interface circuit that is arranged to perform transmissions between an electronic device and a storage device, wherein the transmission interface circuit comprises a power supply port, a first power path, a first data transmission path, a second power path and a controller. The power supply port is coupled to a power. The first power path is coupled to a first power port, wherein the first power port is coupled to the storage device for providing power for the storage device. The first data transmission path is coupled between the storage device and the electronic device. The first data transmission path arranged to perform data transmissions between the storage device and the electronic device. The second power path is coupled to a second power port, wherein the second power port is coupled to the electronic device for providing power for the electronic device. The controller is arranged to respectively controlling the first power path, the second power path and the first data transmission path to be conducting or non-conducting according to a message sent from the electronic device. The electronic device comprises a processor for executing an application (App) capable of determining the arrangement of a power path and a data path of the transmission interface circuit according to operation behaviors of a user. The controller is arranged to receive commands from the App of the processor, and execute operations associated with the power path and the data path.

These and other objectives of the present invention will no doubt become obvious to those of ordinary skill in the art after reading the following detailed description of the preferred embodiment that is illustrated in the various figures and drawings.

DETAILED DESCRIPTION

Some phrases in the present specification and claims refer to specific elements; however, please note that the manufacturer might use different terms to refer to the same elements. Further, in the present specification and claims, the term "comprising" is open type and should not be viewed as the term "consists of." The term "electrically coupled" can refer to either direct connection or indirect connection between elements. Thus, if the specification describes that a first device is electrically coupled to a second device, the first device can be directly connected to the second device, or indirectly connected to the second device through other devices or means.

For better comprehension, in most of the contents of the present invention, some terms such as HDD, HDD enclosure, smartphone, etc. are often used. But they are merely used for illustrative purposes, and are not used limit the scope of the present invention. For example, in some possible modifications of the present invention, "HDD" may be replaced with another device having the storing ability, such as the SSD, USB flash drive or SDcard. Further, the term "HDD enclosure" may refer to a product that contains a control chip and a storage device, but the present invention is not limited thereto. There are still other ways of combining the control chip and storage device. Methods and means that jointly employ the control chip and the storage device can be viewed as an implementation of the enclosure mentioned in the present invention. Moreover, the usages on the smartphone of the present invention can also be expanded to all kinds of electronic device which is portable and has a built-in processor.

The reasons why the related art techniques (such as that mentioned above) surfers such kind of problem may include: after the conventional enclosure is connected to the host (e.g. a computer or smartphone), the controller of the enclosure will immediately initiate the storage device (e.g. HDD) in order to perform reading/writing operations upon the storage device. However, this approach can be risky if the host is portable. For example, due to that the user identity is uncertain, whether the electricity of the smartphone is sufficient is unknown. Hence, the present invention installs an App in the smartphone which is corresponding to the enclosure, and uses the App to inform the controller of the user commands as well as the current state of the smartphone, wherein only when the safety of the smartphone environment and whether the electricity is in a state suitable for transmissions are confirmed, the controller turns on the control storage device with commands.

Figure 1A:
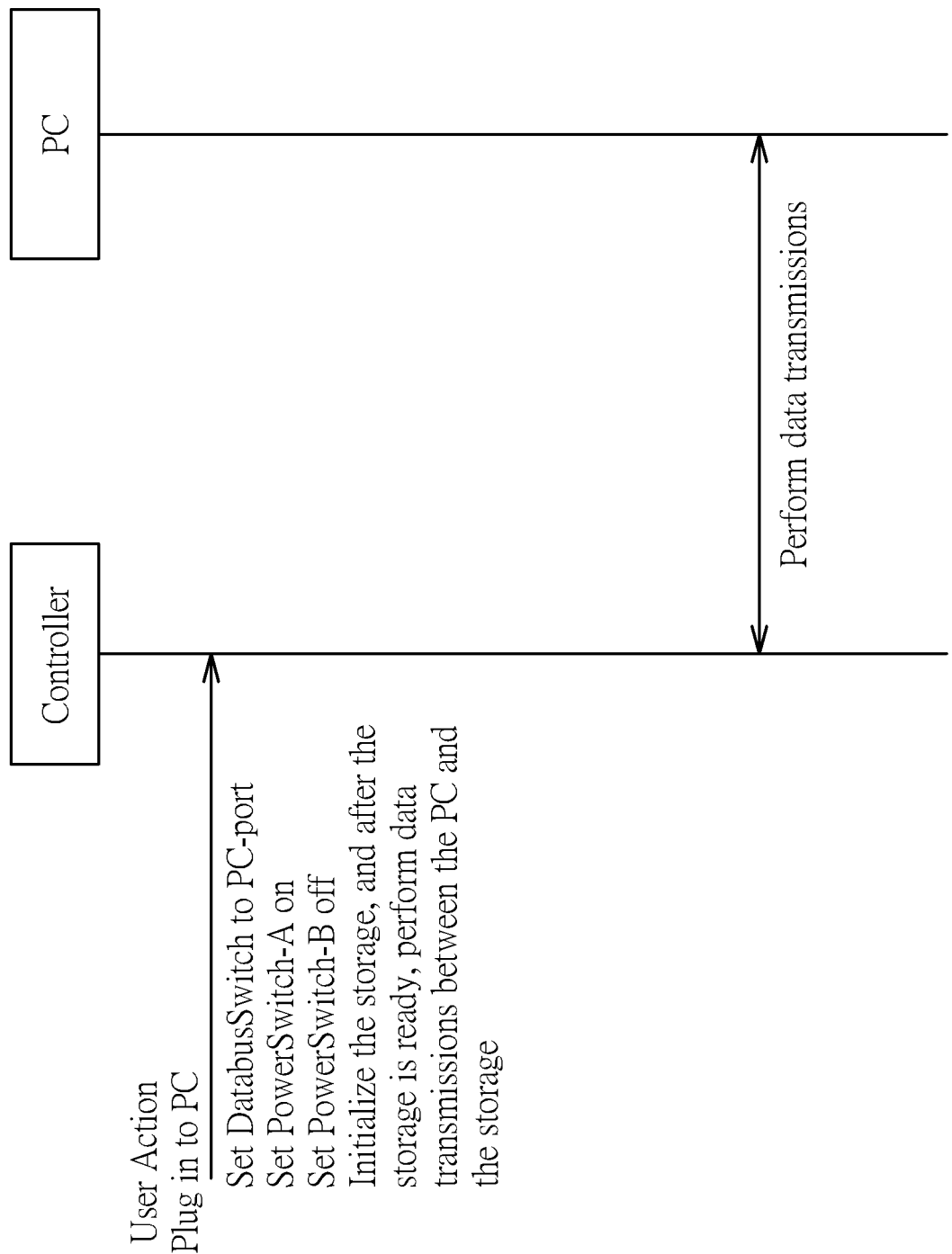
FIG. 1A is a flowchart illustrating a method for controlling a computer to perform data backup according to an embodiment of the present invention.
Figure 1B:
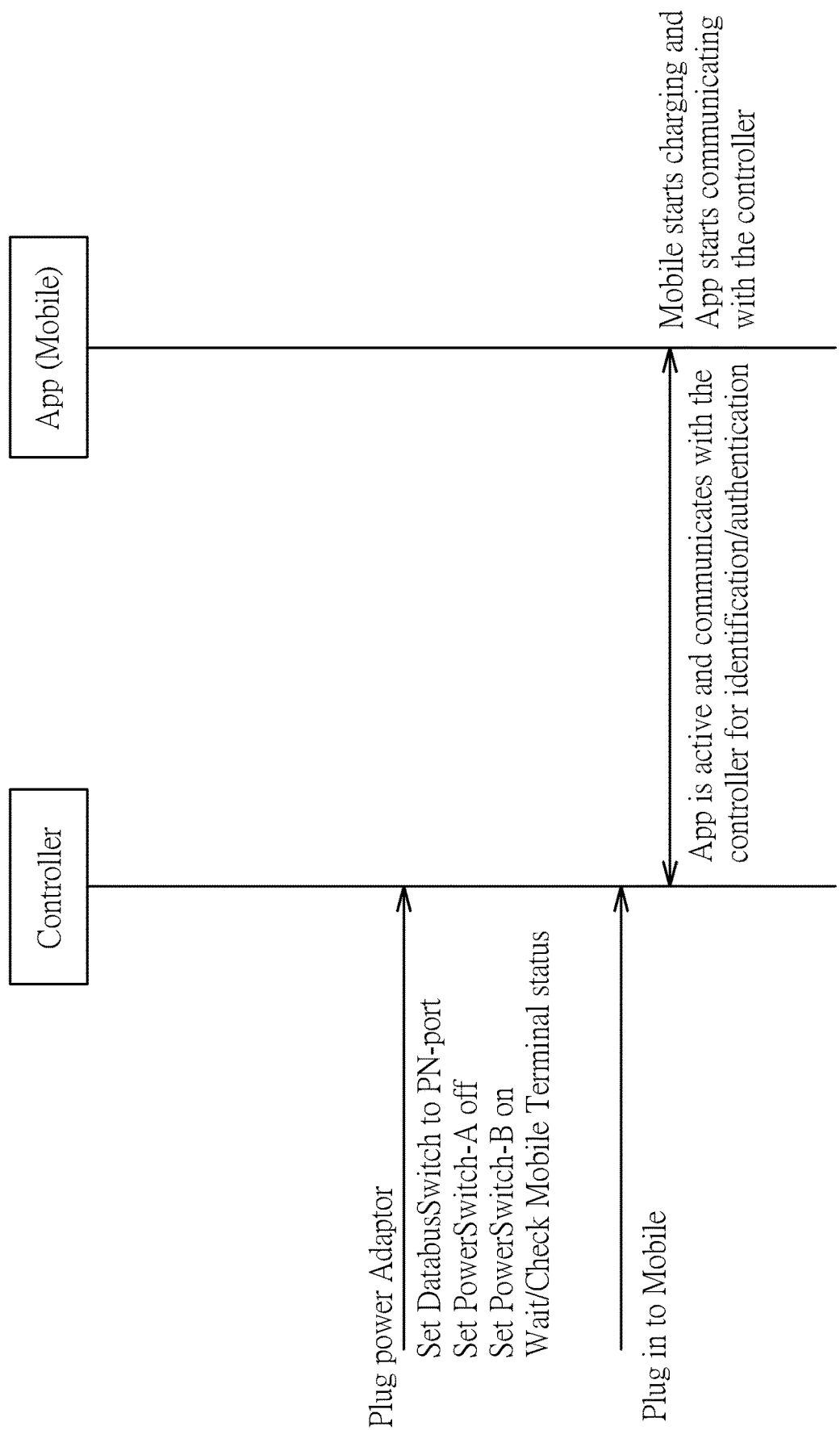
FIG. 1B is a flowchart illustrating a method for controlling charging and data backup of a smartphone according to an embodiment of the present invention.

Please refer to FIG. 1A and FIG. 1B. FIG. 1A is a flowchart illustrating a method for controlling a computer to perform data backup according to an embodiment of the present invention, and FIG. 1B is a flowchart illustrating a method for controlling charging and data backup of a smartphone according to an embodiment of the present invention. When connected to the computer (as shown in FIG. 1A), the enclosure will perform ordinary data transmissions. When being connected to the adopter and smartphone (as shown in FIG. 1B), the enclosure controller will immediately turn off the storage device (or make the storage device enter a standby mode or power saving mode). In another example, the enclosure controller makes the storage device enter the standby mode and the power saving mode only after the smartphone is validated (e.g. the user identity is confirmed as correct) via a smartphone App, Further, the enclosure controller may refer to different user identities to execute in an operational mode that meets personal requirements. For example, the enclosure controller may search for new data in the smartphone that needs to be backed up, and may thereby automatically perform data backup for the smartphone without further operations (or commands) from the user. In addition, said controller may be a bridge controller, but the present invention is not limited thereto.

In an example, before executing the backup schedules, the smartphone may be checked in advance to find out if the electricity reaches a predetermined level (e.g. 70% of the maximum electricity) Only when the electricity reaches the predetermined level, the enclosure controller will be asked to enable the storage device, and the smartphone App may start writing new data into the storage device thereafter.

Figure 3:
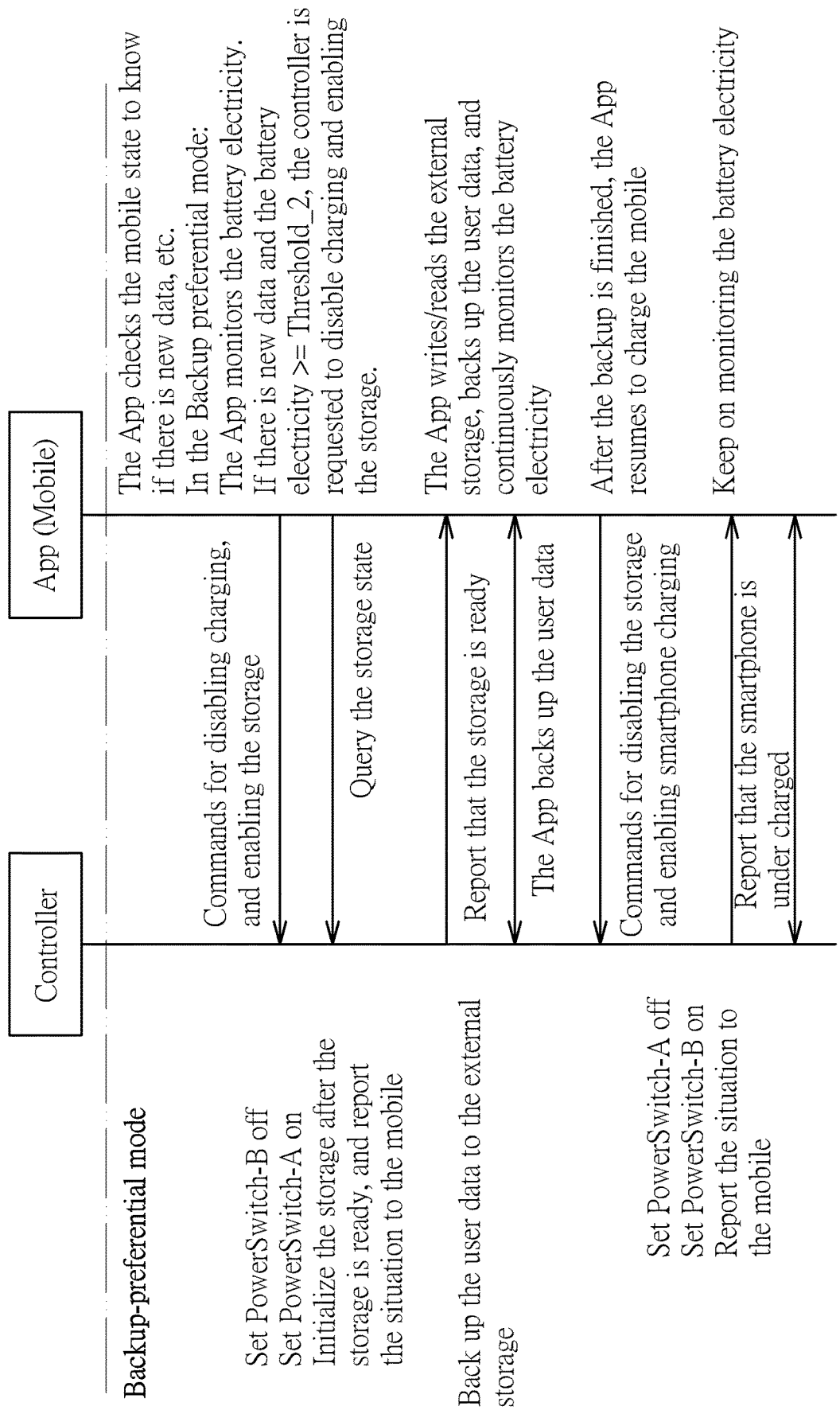
FIG. 3 is a diagram illustrating a backup-preferential mode according to an embodiment of the present invention.

If the user opts backing up new data preferentially (please refer to FIG. 3 which is a diagram illustrating a backup-preferential mode according to an embodiment of the present invention), the smartphone App is forced to inform the enclosure controller to enable the storage device (the charging of smartphone can be paused depending on the smartphone electricity) while the smartphone App is executed in the foreground. In addition, while waiting for the storage device to be ready, the smartphone can be scanned in order to prepare the needed new data for backup. In this way, after the storage device is ready, it can be written with the new data. After the backup is complete, the storage device may be turned off depending on the smartphone electricity, and the smartphone charging may be enabled again thereafter.

Figure 2:
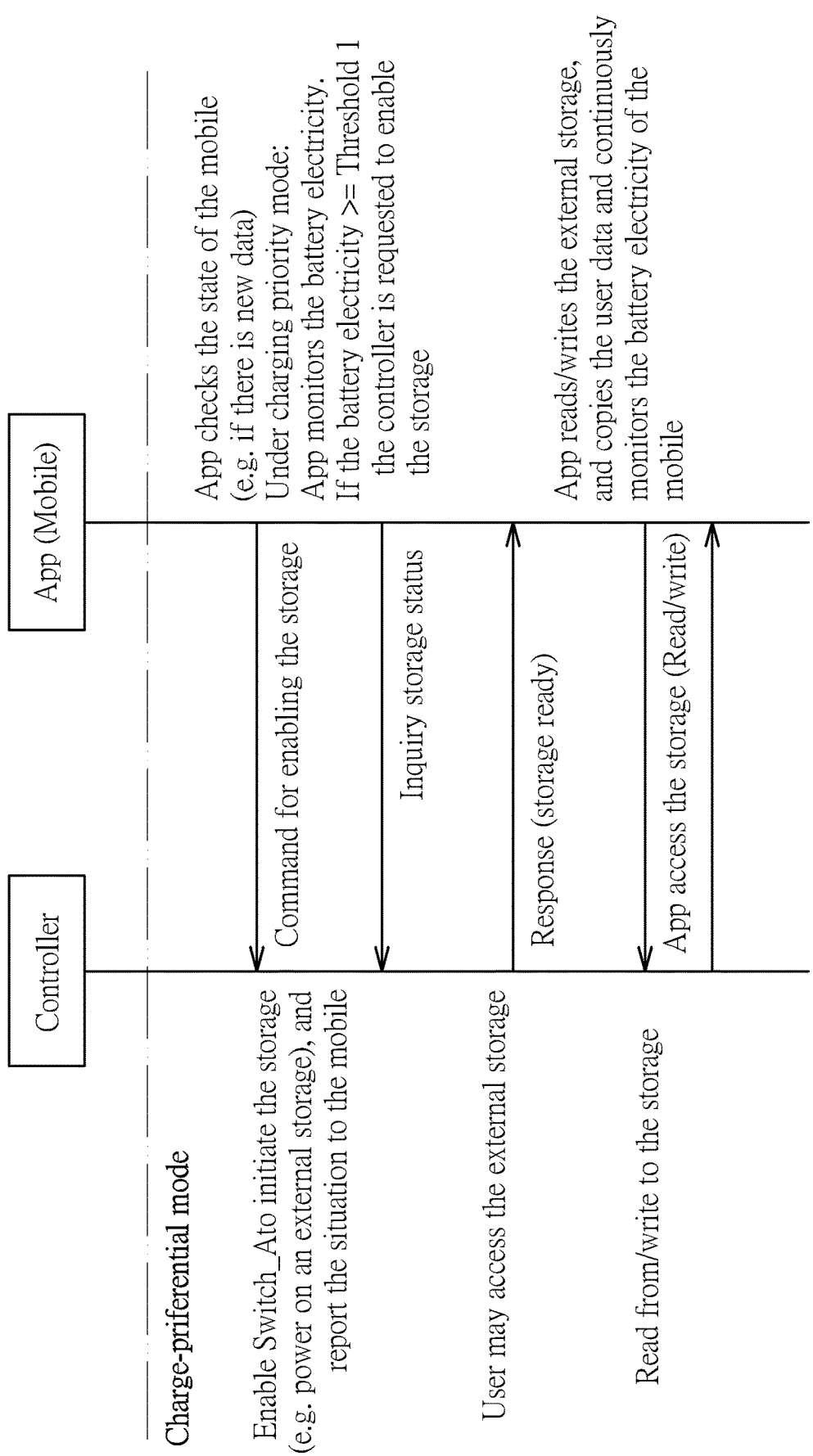
FIG. 2 is a diagram illustrating a charging-preferential mode according to an embodiment of the present invention.

In FIG. 1A, when the enclosure is connected to the computer, the enclosure controller immediately enables the storage device in the enclosure and responses to the query of the computer after the storage device is ready. On the contrary, in the scenario of FIG. 1B, after the enclosure is connected to the power and the smartphone, the enclosure controller does not immediately enable the storage device in the enclosure. Instead, the smartphone App is responsible for controlling the enclosure controller to turn on or turn off the storage device. In another example, the enclosure controller turns on or turns off the storage device only after the smartphone App informs both the enclosure controller and the smartphone of the situation. The smartphone App controls the enclosure controller to turn on or turn off the storage device based on the smartphone state as well as a charging-preferential mode (please refer to FIG. 2, which is a diagram illustrating a charging-preferential mode according to an embodiment of the present invention) or a backup-preferential mode, and then determines the timing of turning on or turning off the storage device. For example, if there is new data to be backed up and the smartphone electricity is at a certain level, the user may operate the App to access the storage device, or later the App may automatically control the enclosure to turn on or turn off the storage device.

In another embodiment of the present invention, if the enclosure storage device is connected to the power prior to the smartphone connecting to the enclosure, the storage device (e.g. an HDD) in the enclosure will not be self-initiated. Instead, the storage device in the enclosure may be enabled by the smartphone App. After the smartphone App is triggered by the external device, the inner state of the smartphone will be checked after the external device is checked as a valid storage device. For example, checking the inner state of the smartphone may include: checking the user identity, checking if there is new data to be backed up, and checking if the smartphone electricity meets a certain level. After the inner state is checked, the charging-preferential mode or the backup-preferential mode is referenced in order to ask the enclosure to turn on/off the storage device or to charge the smartphone. The smartphone charging and backup processes may be sequentially or simultaneously performed in the background.

Figure 4:
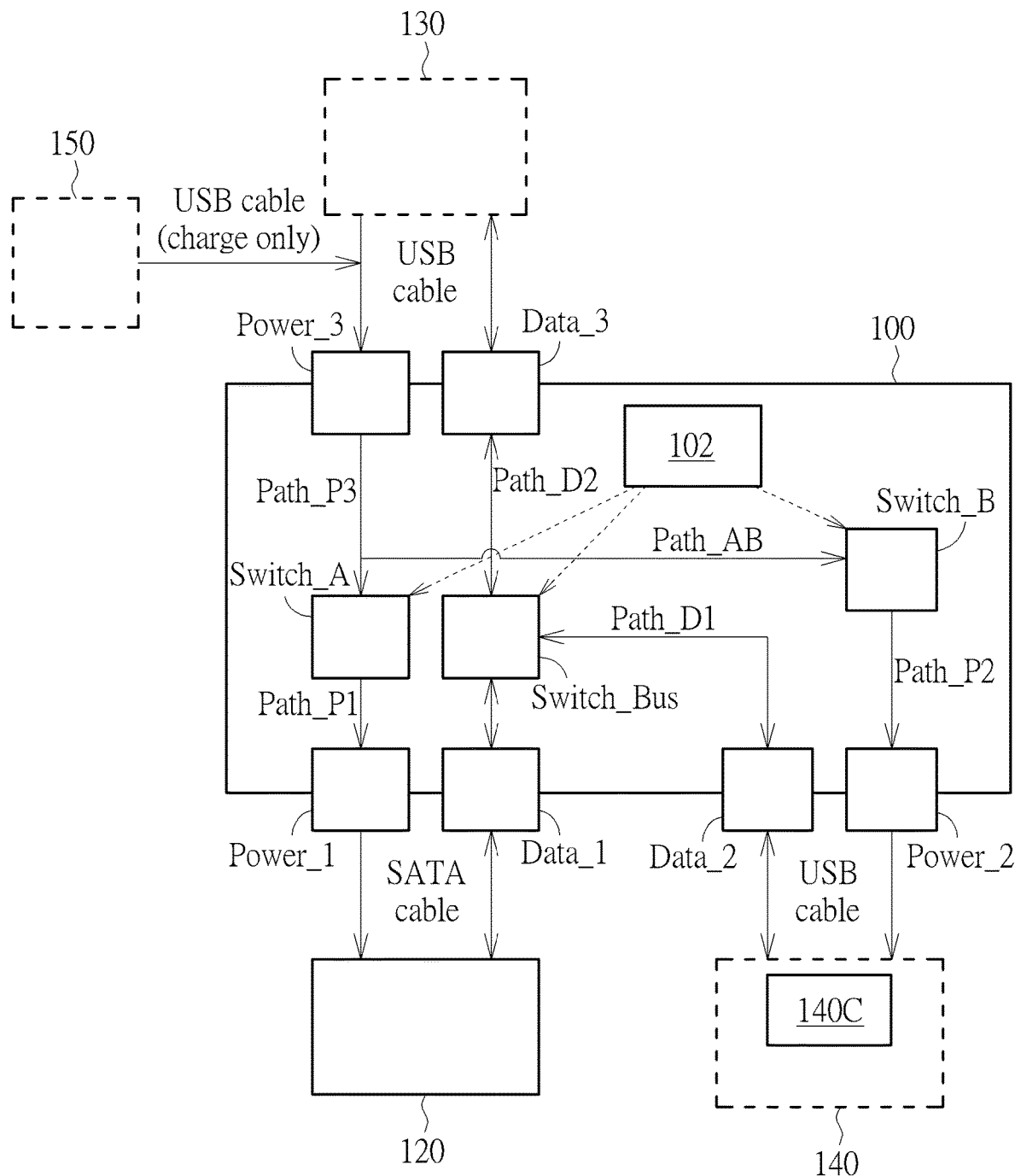
FIG. 4 is a diagram illustrating transmission interface circuit according to an embodiment of the present invention.

Please refer to FIG. 4, which is a diagram illustrating transmission interface circuit 100 according to an embodiment of the present invention. FIG. 4 is a specific architecture of the present invention, and is not meant to be a limitation of the scope of the present invention. In addition, the architecture of FIG. 4 may be implemented by referencing the processes shown in FIGS. 1-3.

The transmission interface circuit 100 is arranged to provide transmissions between an electronic device (e.g. the smartphone 140 or the computer 130) and the storage device 120, and the transmission interface circuit 100 comprises a power supply port Power_3, a first power port Power_1, a second power port Power_2, a first data transmission port Data_1, a second data transmission port Data_2, a third data transmission port Data_3, a first switch Switch_A, a second switch Switch_B and a bus switch Switch_Bus, wherein the first switch Switch_A and the second switch Switch_B are coupled to each other via an inner transmission path Path_AB. The power supply port Power_3 is coupled to a power source (e.g. the power adaptor 150) or a portable power bank. The above-mentioned electronic device may be a smartphone, wearable device, tablet, etc. In this case, the electronic device will be connected to the second power port Power_2 and the second data transmission port Data_2, as shown in the smartphone 140). Otherwise, the electronic device may be a large-sized computer device, such as a desktop or laptop computer, and the electronic device will be connected to the third power port Power_3 and the third data transmission port Data_3 in this case, as shown in the computer 130). In addition, although this embodiment depicts the transmission interface circuit 100 and the storage device 120 as two separate elements, they can be integrated into one device (e.g. an enclosure) in some possible modifications of the present invention.

The third power path Path_P3, the third data transmission port Data_3 and the second data transmission path Path_D2 are arranged to realize the file transmissions between the storage device 120 and the computer 130, wherein the controller 102 may identify the D+/D− signals transmitted by the computer 130 to determine that it is a computer being connected, rather than a power adopter. The computer 130 may be a desktop computer or a laptop computer. The power supply port Power_3 is coupled between the computer 130 and the first power switch Switch_A, the third data transmission port Data_3 is coupled to the computer 130, the second data transmission path Path_D2 is coupled between the third data transmission port Data_3 and the bus switch Switch_Bus, the third power path Path_P3 is coupled between the power supply port Power_3 and the first power switch Switch_A. When the computer 130 is connected to transmission interface circuit 100, the controller 102 makes the first power path Path_P1, the third power path Path_P3, the second data transmission path Path_D2 conduct to one another, and makes the first data transmission path Path_D1 non-conducting. It should be noted that the present invention is not limited to having the ability of connecting to computers, that is, the third data transmission port Data_3 may be omitted in other embodiments. Further, the present invention can also be modified as having the ability of connecting to the smartphones and tablets rather than having the ability of connecting to computers.

The first power path Path_P1 is coupled to the first power port Power_1, wherein the first power port Power_1 is coupled to the storage device 120 in order to provide the storage device 120 with electricity, wherein the storage device 120 may be an SSD or USB disk, but the present invention is not limited thereto. The first data transmission path Path_D1 is coupled between the storage device 120 and the electronic device, and is arranged to perform data transmissions between the storage device 120 and the smartphone 140. In addition, the second power path Path_P2 is arranged to provide smartphone 140 with electricity.

More specifically, the first power path Path_P1 is coupled between the first power switch Switch_A and the first power port Power_1, the first power switch Switch_A is arranged to control the conducting state of the first power path Path_P1, and the first power port Power_1 is coupled to the storage device 120. The first data transmission port Data_1 and the second data transmission port Data_2 are coupled to the storage device 120 and the smartphone 140, respectively. The bus switch Switch_Bus is coupled between the first data transmission port Data_1 and the second data transmission port Data_2, and is arranged to determine the conducting states of the first data transmission path Path_D1 and the second data transmission path Path_D2 (in general, only one of the first data transmission path Path_D1 and the second data transmission path Path_D2 is instantly conducting). The second power path Path_P2 is coupled between the second power switch Switch_B and the second power port Power_2; wherein the second power switch Switch_B is arranged to control the conducting state of the second power path Path_P2. The App 140C installed in the smartphone 140 transmits messages or commands to the controller 102, and the controller 102 may respectively control the conducting state of the first power path Path_P1, the second power path Path_P2 and the first data transmission path Path_D1 according to the messages (or commands) transmitted from the electronic device. The messages transmitted by the App 140C comprise at least one of the electricity state and a user mode of the smartphone 140, wherein the App 140C may periodically transmit a message to the transmission interface circuit 100, or otherwise, the controller 102 may send a state request to the smartphone 140. After the smartphone 140 receives the state request, the smartphone 140 will generate messages accordingly, and the generated messages will be reported to the transmission interface circuit 100 (more particularly the controller 102 therein) via the App 140C. Regarding "commands", the content thereof includes the switch settings of the switches Switch_A and Switch_B, and the App 140C may determine the switch settings of the switches Switch_A and Switch_B according to the operational behaviors of the user.

In an embodiment, the controller 102 executes a default mode in the beginning in order to make the first power path Path_P1 conducting, make the first data transmission path Path_D1 non-conducting, and make the second power path Path_P2 conducting. The objective of the above approach is to avoid backup failure when the information is insufficient, or to avoid the power consumption when the smartphone electricity is not sufficient enough.

Further, if the smartphone side is not installed with the App 140C, the controller 102 may disable the first data transmission path Path_D1, so that the smartphone may only be charged after being coupled to the transmission interface circuit 100. The App 140C may monitor the smartphone electricity if necessary, wherein the process of monitoring the electricity may be performed by the App 140C automatically, or otherwise the control 102 may send the request to the App 140C and then ask the App 140C to perform the process of monitoring the electricity. When the electricity of the smartphone 140 is lower than a predetermined electricity (e.g. 70% of the maximum electricity, but the present invention is not limited thereto), the App 140C will remain in the default mode. In another case, when the electricity of the smartphone 140 is higher than above-mentioned predetermined electricity, the App 140C will disable the default mode, and perform the following operation: under the situation wherein the state of the second power switch Switch_B is preserved, enabling the first power switch Switch_A and the bus switch Switch_Bus in order to provide power for the storage device 120 and perform data transmissions between the smartphone 140 and the storage device 120. If the electricity state of the smartphone 140 appears to be lower than another predetermined electricity (wherein the other predetermined electricity is lower than the aforementioned predetermined electricity, and the other predetermined electricity may be 65% of the maximum electricity). During this process, the first power switch Switch_A and the bus switch Switch_Bus will be disabled in order to stop providing power for the storage device 120. The operation of setting the electricity-lost interval between 65%-70% of the maximum electricity may prevent turning on/off the storage device 120 too frequently which might damage the HDD. For example, if the electricity-lost interval is set between 69%-70% (which is relatively small in comparison with the aforementioned 65%-70%), the concern mentioned above may be raised (i.e. the storage device being turned on/off to frequently).

When the user mode is the charging-preferential mode (the embodiment in FIG. 2 can be referred), the controller 102 performs following operations: making the first power path Path_P1 and the first data transmission path Path_D1 non-conducting, and making the second power path Path_P2 conducting. However, even under the charging-preferential mode, the transmission interface circuit 100 may still back up the data. For example, the App 140C may monitor the electricity state of the smartphone 140 in the charging-preferential mode, and if the electricity state of the smartphone 140 is higher than the predetermined electricity (e.g. 70% of the maximum electricity), the App 140C may perform the following operation: under the control of the controller 102 and under the situation where the second power path Path_P2 remains conducting, switching the first power path Path_P1 and the first data transmission path Path_D1 from non-conducting into conducting.

When the user mode is in the backup-preferential mode (the embodiment in FIG. 3 may be referred), the App 140C performs the following operation: under the control of the controller 102, making the first power path Path_P1 and the first data transmission path Path_D1 conducting, and making the second power path Path_P2 non-conducting.

In view of the above, embodiments of the present invention may achieve the goals of charging the smartphone and properly managing the data backup, wherein the actual situations of the smartphone and operational behaviors of the user are references for determining whether to execute the charging-preferential mode or the backup-preferential mode, and therefore greatly improving the user experience. In addition, the enclosure controller of the present invention may adopt an optimized charging-backup management solution according to the information (the user mode, battery electricity, etc.) reported by the App.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission interface circuit, arranged to provide transmissions between an electronic device and a storage device, the transmission interface circuit comprising:
   a power supply port, coupled to a power source;
   a first power path, coupled to a first power port, wherein the first power port is coupled to the storage device for providing power for the storage device;
   a first data transmission path, coupled between the storage device and the electronic device, and arranged to perform data transmissions between the storage device and the electronic device;
   a second power path, coupled to a second power port, wherein the second power port is coupled to the electronic device for providing power for the electronic device; and
   a controller, arranged to control the first power path, the second power path and the first data transmissions to be conducting or non-conducting according to a message sent from the electronic device.

2. The transmission interface circuit of claim 1, wherein the power source coupled to the power supply port is a power adaptor or a portable power bank.

3. The transmission interface circuit of claim 1, wherein the electronic device is a smartphone, wearable device, tablet, desktop computer or laptop computer.

4. The transmission interface circuit of claim 1, wherein the message coming from the electronic device is provided by an application (App) installed in the electronic device that is corresponding to the transmission interface circuit.

5. The transmission interface circuit of claim 4, wherein the message comprises at least one of an electricity state and user mode of the electronic device, wherein:
   the App transmits the message to the transmission interface circuit periodically; or
   the controller automatically sends a state request to the electronic device, and after receiving the state request, the electronic device generates the message accordingly and reports the message to the controller via the App.

6. The transmission interface circuit of claim 1, further comprising:
   a first power switch and a first power port, wherein the first power path is coupled between the first power switch and the first power port, the first power switch is arranged to control the first power path to be conducting or non-conducting, and the first power port is coupled to the storage device;
   a first data transmission port and a second data transmission port, coupled to the storage device and the electronic device respectively;
   a bus switch, coupled between the a first data transmission port, a second data transmission port and a third data transmission port, the bus switch arranged to determine whether to enable at least the first data transmission path or the second data transmission path; and
   a second power switch and a second power port, wherein the second power path is coupled between the second power switch and the second power port, the second power switch is arranged to control the second power path to be conducting or non-conducting state, and the second power port is coupled to the electronic device.

7. The transmission interface circuit of claim 6, further comprising a third power path, a third data transmission port and a second data transmission path; wherein the electronic device is a desktop computer or a laptop computer, the power supply port is coupled between the electronic device and the first power switch, the third data transmission port is coupled to the electronic device, the second data transmission path is coupled between the third data transmission port and the bus switch, the third power path is coupled between the power supply port and the first power switch;

and when the electronic device is connected to the transmission interface circuit, the controller makes the first power path, the third power path, the second data transmission path conducting, and makes the first data transmission path non-conducting.

8. The transmission interface circuit of claim 6, wherein the controller executes a default mode initially in order to make both the first power path and the first data transmission path non-conducting, and make the second power path conducting.

9. The transmission interface circuit of claim 8, wherein when the electricity amount of the electronic device is lower than a first predetermined electricity amount, the controller remains in the default mode.

10. The transmission interface circuit of claim 8, wherein when the electricity amount of the electronic device is higher than a first predetermined electricity amount, the controller disables the default mode and performs following operations:
  enabling the first power switch and the bus switch without changing the state of the second power switch, in order to provide power for the storage device and perform data transmissions between the electronic device and the storage device at the same time.

11. The transmission interface circuit of claim 10, wherein when the electricity state of the electronic device is lower than a second predetermined electricity, the first power switch and the bus switch is disabled, in order to stops providing power for the storage device, wherein the second predetermined electricity is lower than the first predetermined electricity.

12. The transmission interface circuit of claim 6, wherein when the user mode is a charging-preferential mode, the controller performs following operations:
  making the first power path and the first data transmission path non-conducting, and making the second power path conducting.

13. The transmission interface circuit of claim 12, wherein the controller monitors the electricity state of the electronic device in the charging-preferential mode, if the electricity state of the electronic device is higher than a first predetermined electricity, the controller performs following operations:
  under the situation where the second power path is reserved in the conducting state, switching the first power path and the first data transmission path from non-conducting to conducting.

14. The transmission interface circuit of claim 6, wherein when the user mode is a backup-preferential mode, and the controller performs following operations:
  making the first power path and the first data transmission path conducting, and making the second power path non-conducting.

15. A transmission interface circuit, arranged to perform transmissions between an electronic device and a storage device, wherein the transmission interface circuit comprises:
  a power supply port, coupled to a power;
  a first power path, coupled to a first power port, wherein the first power port is coupled to the storage device for providing power for the storage device;
  a first data transmission path, coupled between the storage device and the electronic device, the first data transmission path arranged to perform data transmissions between the storage device and the electronic device;
  a second power path, coupled to a second power port, wherein the second power port is coupled to the electronic device for providing power for the electronic device; and
  a controller, arranged to respectively controlling the first power path, the second power path and the first data transmission path to be conducting or non-conducting according to a message sent from the electronic device;
  wherein the electronic device comprises a processor for executing an application (App) capable of determining the arrangement of a power path and a data path of the transmission interface circuit according to operation behaviors of a user; and the controller is arranged to receive commands from the App of the processor, and execute operations associated with the power path and the data path.

* * * * *